United States Patent
Lindqvist et al.

(10) Patent No.: US 8,254,527 B2
(45) Date of Patent: Aug. 28, 2012

(54) METHOD AND ARRANGEMENT FOR LOOP QUALIFICATION IN A DIGITAL SUBSCRIBER LINE (DSL) SYSTEM

(75) Inventors: Fredrik Lindqvist, Älvsjö (SE); Jaume Rius i Riu, Vällingby (SE); Joäo C. Weyl Albuqerque Costa, Belém (BR); Claudomiro de Souza de Sales, Jr., Belém (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 587 days.

(21) Appl. No.: 12/446,259

(22) PCT Filed: Oct. 20, 2006

(86) PCT No.: PCT/SE2006/050417
§ 371 (c)(1),
(2), (4) Date: Apr. 20, 2009

(87) PCT Pub. No.: WO2008/048156
PCT Pub. Date: Apr. 24, 2008

(65) Prior Publication Data
US 2010/0296633 A1 Nov. 25, 2010

(51) Int. Cl.
*H04M 1/24* (2006.01)
(52) U.S. Cl. ............ 379/1.03; 379/27.01; 379/377
(58) Field of Classification Search .......... 379/1.03, 379/1.04, 22.04; 375/222
See application file for complete search history.

(56) References Cited

U.S. PATENT DOCUMENTS 7,970,105 B2 * 6/2011 Aydin et al. .......... 379/1.03
2003/0002658 A1 * 1/2003 Belge et al. ............ 379/377
(Continued)

FOREIGN PATENT DOCUMENTS
EP 1424841 A1 6/2004

OTHER PUBLICATIONS

Bostoen, T. et al. Estimation of the Transfer Function of a Subscriber Loop by Means of a One-Port Scattering Parameter Measurement at the Central Office. IEEE Journal on Selected Areas in Communications, pp. 936-948, vol. 20, No. 5, Jun. 2002.
Sales, C. et a. Line Topology Identification using Multi-Objective Evolutionary Computation. IEEE Transactions on Instrumentation and Measurement. 2008.
Costa, J C W A et al: "Characterization of Subscriber Local Loop by Measures and Analysis of Frequency and Impulse Responses", Proc. SPIE 6390, Oct. 2, 2006, see p. 1-p. 11.
Eriksson, P-E et al: "VDSL2: Next important broadband technology", Ericsson Review No. 1, 2006, pp. 36-47.

*Primary Examiner* — Creighton Smith

(57) ABSTRACT

A method and loop qualification unit for determining loop parameters of a topology of a twisted pair loop for a digital subscriber line system. The parameters are represented by a vector that receives a measurement of a SELT parameter measured at one end of the loop and a measurement of a DELT loop transfer function measured at both ends of the loop. A first model generator generates a first model for the SELT parameter and a second model generator generates a second model for the DELT function based on the loop parameters represented by the vector. A processor then determines the parameters by minimizing the differences between the first model and the SELT parameter, and the second model and the DELT function. The determined parameters are represented by the vector that provides the minimization.

20 Claims, 14 Drawing Sheets type: 'serial' or 'bridge tap'
length: double (meter)
Gauge: double (meter)

U.S. PATENT DOCUMENTS

| | | |
|---|---|---|
| 2005/0069028 A1* | 3/2005 | Belge et al. ................... 375/222 |
| 2005/0163287 A1* | 7/2005 | Ouyang et al. ................... 379/3 |
| 2006/0120442 A1* | 6/2006 | Melsa et al. ................... 375/222 |
| 2006/0251160 A1* | 11/2006 | Fazlollahi et al. ............ 375/222 |
| 2006/0251221 A1* | 11/2006 | Rosenberg ................. 379/22.01 |
| 2007/0014393 A1* | 1/2007 | Jensen et al. .................... 379/30 |
| 2007/0189464 A1* | 8/2007 | Schmitt et al. ............... 379/1.01 |
| 2009/0024340 A1* | 1/2009 | Borjesson et al. .............. 702/65 |
| 2009/0161741 A1* | 6/2009 | Ginis et al. .................... 375/224 |
| 2009/0268879 A1* | 10/2009 | Borjesson et al. ......... 379/32.04 |

* cited by examiner $$nsecs = maxnsecs - 0.5 + (maxnsecs - minnsecs + 1) * M$$

$$nsecs = round(nsecs)$$

$$nsecs = 3$$

| Section$_{maxnsecs}$ | BT1 | BT2 | ... | BTK | M | N |

$nsecbt = nsecs - 1$ $maxnbt = round(nsecbt/2)$ $nbt = maxnbt - 0.5 + (maxnbt - minnbt + 1) * N$ $posfirstbt = \max(BT2 : BTnsecs)$

Fig. 9

METHOD AND ARRANGEMENT FOR LOOP QUALIFICATION IN A DIGITAL SUBSCRIBER LINE (DSL) SYSTEM

TECHNICAL FIELD

The present invention relates to a method and arrangement for loop qualification in a digital subscriber line (DSL) system. In particular, the present invention provides a solution for determining loop parameters associated with the DSL by using Single Ended Line Test (SELT) and Double Ended Line Test (DELT) measurements, preferably based on evolutionary computation.

BACKGROUND

Digital subscriber lines (DSLs) offer carriers the possibility of exploiting the existing loop plant to deliver high-speed data and voice services. Today several types of Digital Subscriber Line (DSL) technologies are rapidly becoming standards for delivering access on copper access network cables to the end user. Examples of DSL technologies (sometimes called xDSL) include High Data Rate Digital Subscriber Line (HDSL), Asymmetric Digital Subscriber Line (ADSL), and Very-high-bit-rate Digital Subscriber Line (VDSL).

The DSL, which connects the customer premises (CP) to the central office (CO), has several impairments that are not present for the plain old telephony service (POTS) because xDSL exploits a much wider frequency band. As a consequence, the existing POTS testing equipment is not capable of accurately qualifying a subscriber loop for xDSL transmission. There are impairments causing attenuation, such as bridged taps, mixed wire gauge, and bad splices. In order to qualify a subscriber loop for xDSL transmission it is desired to fully characterize the subscriber loop, i.e., to identify its loop makeup. The loop (=line) make up implies in this description parameters such as the total length of the loop, number of sections, length and gauge (i.e. the diameter) of each section, splice location, and number of bridged taps and their position and length. Loop make-up identification allows telephone companies to update and correct their loop plant records. Therefore, accurate loop make-up identification can further be used to update records in loop databases, and such records can in turn be accessed to support engineering, provisioning and maintenance operations.

In this way, the development of automatic loop makeup techniques is very important for cost reduction during the service deployment stage and even afterwards, during preventive monitoring tests against eminent service failures. Nowadays, there are several works that address this issue, but the majority is focused on single-ended techniques referred to as Single ended Line Test (SELT). The SELT may be based on Time Domain Reflectometry (TDR). TDR implies an analysis of a loop (wire, cable, or fiber optic) by sending a pulsed signal into the loop, and then examining the reflection of that pulse. By examining the polarity, amplitude, frequencies and other electrical signatures of all reflections, tampering or bugs may be precisely located. Frequency-domain reflectometry (FDR) is another technique that SELT may be based on. In FDR, the loop is sounded with a swept sinusoid to identify frequencies that either resonate or are "dead." For example, peaks in the measured receive signal correspond to frequencies that create standing waves. Standing wave frequencies provide information about the length of the cable.

Moreover, SELT may also be based on a parameter referred to as One-Port Scattering Parameter, denoted S11 or echo response: This method is similar to the FDR, but instead of looking for individual frequencies, a complete echo response measurement is utilized. From the echo response, the input impedance or S11 of the loop can be determined, from which the loop topology can be determined.

With the advent of G.992.3 and G.992.5 standards for ADSL 2 and ADSL 2+, modems with the function loop-diagnostic became possible. These modems located at the user side, jointly with the IPDSLAM (Internet Protocol Digital Subscriber Line Access multiplexer) located at the CO-side, enable measurement of the attenuation per tone, referred to as the transfer function, directly. As it is possible to have two port measurements, it is possible to determine the ratio between the signal at input and output of the line and thus a measurement of the transfer function can be obtained. This new functionality brings forth the perspective of new, reliable and precise techniques for loop makeup identification and supervising. Such two-terminal measurements are referred to as DELT (Double Ended Line Test), in contrast to the SELT.

The most common qualification method concentrates on mining on the existing data in loop databases, checking its accuracy, and then bulk-provisioning loops that are candidates for DSL-based service. Sometimes a combination of loop records and engineering information about feeder route topology is used to obtain an estimate of loop length. This technique presents quite imprecise estimative. Often such data are not reliable or non-existing. Furthermore, manual Loop Qualification (LQ) with human intervention is costly and open up for human errors.

A great number of articles about loop qualification (LQ) methods are based on TDR data obtained from SELT measurements. Previous attempts to use TDR techniques, sometimes coupled to artificial neural network algorithms, have failed due to the difficulty of the post-processing of the TDR trace needed to extract all loop features. Moreover, conventional metallic TDRs are not capable of detecting all reflections. In fact, conventional metallic TDRs cannot detect gauge changes and, moreover, have a serious range limitation that prevents them from detecting reliably echoes further than several kilometers (km) from the Central Office (CO). Besides, it is necessary with additional processing of the TDR data because accurate TDR measurements alone are not sufficient without an algorithm able to extract information from the TDR trace (i.e. TDR plot or curve). That implies that the additional time for this processing is required and the processing of the TDR data is not trivial and could be subjective, making automation of this technique very difficult. In particular, a major problem arises in a TDR approach since observations available at the receiver consist of an unknown number of echoes, some overlapping, some spurious, that exhibit unknown amplitude, unknown time of arrival and unknown shape. Thus, the conventional TDR technique can demand some modifications of the measurements setup and more complicated pre-processing as can be seen in K. J. Kerpez, S. Galli, "Single-Ended Loop Make-up Identification—Part I: Improved Algorithms and Performance Results," *IEEE Transactions on Instrumentation and Measurement*, vol. 55, no. 2, April 2006.

Another type of single-ended technique for loop-qualification is proposed in T. Bostoen, P. Boets, M. Zekri, L. Van Biesen, T. Pollen and D. Rabijas, "Estimation of the Transfer Function of a Subscriber Loop by means of a One-Port Scattering Parameter Measurements at the Central Office." *IEEE J. Select. Areas Commun.*, pp. 936-948, Vol. 20, N° 5, June 2002. According to this reference, it is proposed the use of the one-port scattering parameter $S_{11}$ to achieve channel transfer function estimation when a priori information of the loop topology is available. Although this allows good results on short/medium length loops, the assumption that some or all the loop topology is known prior to testing may limit the practical applicability of this technique. In addition, the technique may present no feasible results, i.e., achieve non-physically loops.

From the G.992.3 and G.992.5 standards for ADSL 2 and ADSL 2+, the loop diagnostic functionality for modems was standardized, enabling double ended measurements (DELT). Thus with DELT, the direct loop transfer function estimation, i.e. the estimation of the attenuation per tone, can be measured without the need of auxiliary techniques. Such functionality is still under test and only a few papers are focused on transfer function measurements applied on loop makeup identification. In J. L. Fang, C. Zeng and J. Cioffi, "Bridged Tap Location Estimation," Electrical Engineering Department, Stanford University, 2003, it is proposed a Bridged-tap location approach from transfer function measurements. But, this method addresses just simple loops with a single bridge-tap.

As described above, it is desired for telecommunication operators to identify the complete loop makeup e.g. in order to predict possible bit rates and other performance parameters in the network. However, the SELT and the DELT methods referenced above fail to accurately identify the complete loop make up.

SUMMARY

Thus, the object of the present invention is to provide methods and arrangements for identifying the loop makeup.

The object is according to a first aspect achieved by a method comprising the steps of receiving a measurement of a SELT parameter measured at one end of said two ends, receiving a measurement of a DELT loop transfer function measured at said two loop ends; generating a model for the SELT parameter based on the loop parameters represented by the vector θ, generating a model for the DELT loop transfer function based on the loop parameters represented by the vector θ and determining the loop parameters represented by the vector θ by minimizing the difference between the model and the measurement of the SELT parameter and by minimizing the difference between the model and the measurement of the DELT loop transfer function, whereby the determined loop parameters are represented by the vector θ that provides said minimizations.

According to a second aspect of the present invention a loop qualification unit for determining loop parameters describing a topology of a twisted pair loop, having two ends, for a digital subscriber line system, wherein the loop parameters being represented by a vector θ comprising a receiving member for receiving a measurement of a SELT parameter measured at one end of said two ends and for receiving a measurement of a DELT loop transfer function measured at said two loop ends is provided. The loop qualification unit comprises a model generator for generating a model for the SELT parameter based on the loop parameters represented by the vector θ; a model generator for generating a model for the DELT loop transfer function based on the loop parameters represented by the vector θ; and a processor for determining the loop parameters represented by the vector θ by minimizing the difference between the model and the measurement of the SELT parameter and by minimizing the difference between the model and the measurement of the DELT loop transfer function, whereby the determined loop parameters are represented by the vector θ that provides said minimizations.

According to an embodiment the SELT parameter is a one port scattering parameter $S_{11}$.

According to a further embodiment the SELT parameter is an input impedance $Z_{in}$.

According to a further embodiment, an optimization method of genetic algorithm is applied for searching for a parameter configuration of vector θ that minimizes said differences.

According to a further embodiment, said receiving member, the model generators, and the processor are adapted to be operated at least a second time whereby said measurements are performed in a different frequency range.

According to an embodiment the loop parameters comprises at least one of gauge, length, and type.

Moreover, the unit may be preferably located in a Central Office modem e.g. on a centralized LQ management system. The unit may also be located in a customer premise modem, e.g. on a centralized LQ management system.

An advantage with the present invention is that it uses the newest measurement setup based on ITU-T G.992.3 and G.992.5 standards, which provides fast and accurate DELT measurements. The multi-dimensional objective functions, i.e. equations (1) and (2), can be solved using NSGA-II, which provides an optimization technique that is easy to implement. NSGA-II is further described in K. Deb, A. Pratap, S. Agarwal and T. Meyarivan, "A fast and elitist multi-objective genetic algorithm: NSGA-II," Evolutionary Computation, IEEE Transaction on Volume 6, Issue 2, April 2002 Page(s): 182-197. Basically, the proposed methodology does not need additional pre-processing of the data as techniques based on for instance TDR.

A further advantage is that the techniques used in the present invention can be easily extended and modified. Moreover, improvements can quickly be integrated. The Genetic Algorithm (GA) concept gives the methodology a high level of flexibility.

BRIEF DESCRIPTION OF THE DRAWINGS

FIG. 9 shows the bridge-tap decoding process.

DETAILED DESCRIPTION

Figure 1:
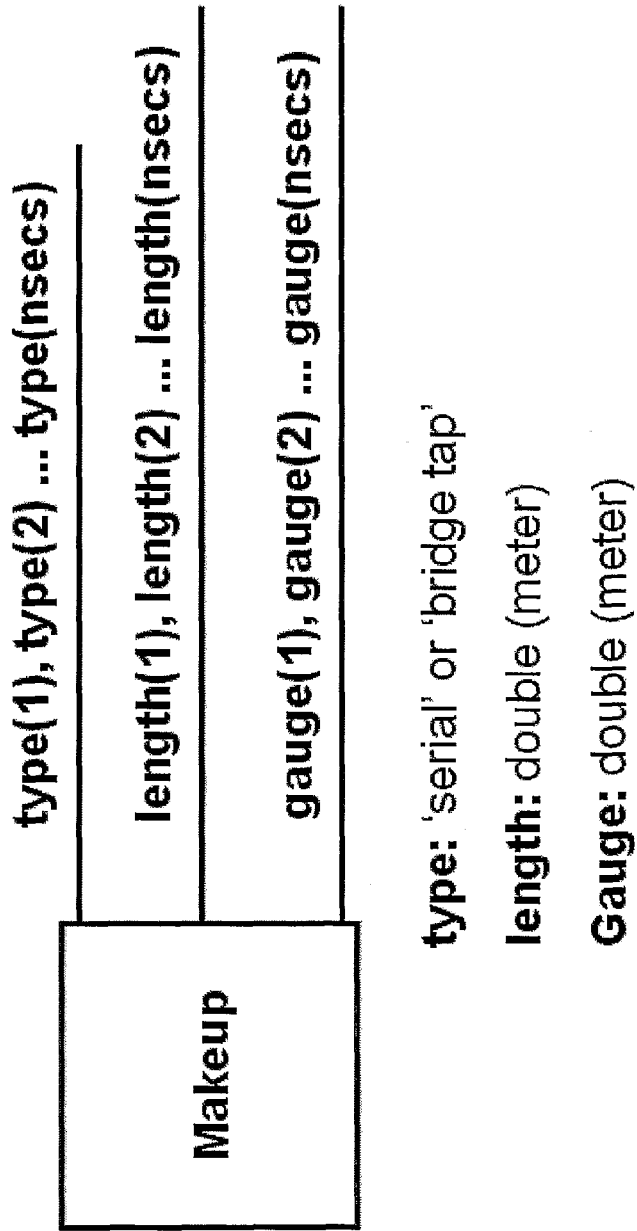
FIG. 1 illustrates examples of loop parameters to be determined by the present invention.

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above, it is not possible to detect all reflections or echoes by using SELT measurements which results in that the loop makeup cannot be accurately identified. Further, only DELT measurements do neither provide enough information for determining the loop makeup (i.e. the loop parameters). The basic idea with the present invention is to combine SELT measurements, e.g. measurements of the scattering parameter, S11 or the input impedance Zin, with the above described transfer function obtained by DELT measurements. Hence, according to the present invention DELT measurements, i.e. measurements of the transfer function (H), in combination with SELT measurements of S11 or Zin are used to estimate loop parameters such as type, length, gauge shown in FIG. 1, wherein the loop parameters represent the loop makeup.

Hence, the method and loop qualification unit according to the present invention makes it possible to estimate the loop parameters length, loop type and gauge (wire diameter) for each section of the loop, as well as number of sections of the loop. The type can be serial or bridged-tap. The length and gauge are given in unit meters or e.g. feet. The loop parameters are represented by a vector $\theta$, e.g. $\theta$=[type, length, gauge] for each section of the loop. According to the present invention, it is required to receive both single and double ended measurements of the loop under test e.g. the scattering parameter (S11) obtained by SELT and the transfer function measurements (H) obtained by DELT.

Thus the loop parameters are determined by receiving a measurement of a SELT parameter and the DELT loop transfer function, generating a model for the SELT parameter based on the loop parameters represented by the vector $\theta$, generating a model for the DELT loop transfer function based on the loop parameters represented by the vector $\theta$ and determining the loop parameters represented by the vector $\theta$ by minimizing the difference between the model and the measurement of the SELT parameter and by minimizing the difference between the model and the measurement of the DELT loop transfer function, whereby the determined loop parameters are represented by the vector $\theta$ that provides said minimizations.

It should be noted that the steps above may be performed repeatedly whereby the measurements are performed in different frequency ranges in order to achieve even better accuracy.

Therefore, if the used SELT parameter is the scattering parameter S11 in accordance with one embodiment, the loop parameters are determined by finding a vector $\theta$ that results in an $S_{11}^{model}$ and an $H^{model}$ that generates a minimum for the Mean Squared Error (MSE) defined by function $V_1(\theta)$ and also for the MSE defined by $V_2(\theta)$, wherein $S_{11}^{measurement}$, and $H^{measurement}$ are the measurements of the scattering parameter and the transfer function, respectively.

$$V_1(\theta) = \sum_{k=1}^{N} \frac{|S_{11}^{model}(f_k, \theta) - S_{11}^{measurement}|^2}{\sigma_{S_{11},k}^2} \quad \text{Equation (1)}$$

$$V_2(\theta) = \sum_{k=1}^{N} \frac{|H^{model}(f_k, \theta) - H^{measurement}|^2}{\sigma_{H,k}^2} \quad \text{Equation (2)}$$

As stated above, $\theta$ is a parameter array with estimated loop parameters such as gauge, length and type as shown in FIG. 1. $f_k$ is the $k_{th}$ used frequency tone and N is the number of used tones. For ADSL 2+, the maximum value of N is equal to 512 tones. $\sigma_{S_{11},k}$ is estimate of the variance of the expected value of the kth frequency sample of the measured scattering parameter and $\sigma_{11,k}$ is estimate of the variance of the expected value of the kth frequency sample of the measured transfer function. Note that $f_k$, used in equations (1) and (2), does not necessary correspond to the ADSL 2 or 2+ tone numbers, as FIG. 2 also illustrates. The equations (1) and (2) are defined as objective function or cost function related to the optimization process. Essentially, such function quantifies the difference between the measured quantity and the model of that one. This is done by the summation of such difference at each tone of the frequency range used. Such sum is called residual of the cost-function. I.e., for every data point, the distance vertically from the point to the corresponding point on the curve fit (the error) is taken, and this value is squared. Then all those squared values for all data points are added, and divided by the number of points. The squaring is done to avoid that negative values from cancelling positive values. The smaller the Mean Squared Error (MSE), the closer the fit is to the data.

If Zin is used instead of S11, S11 is replaced by Zin in the equations (1) and (2).

Figure 2A:
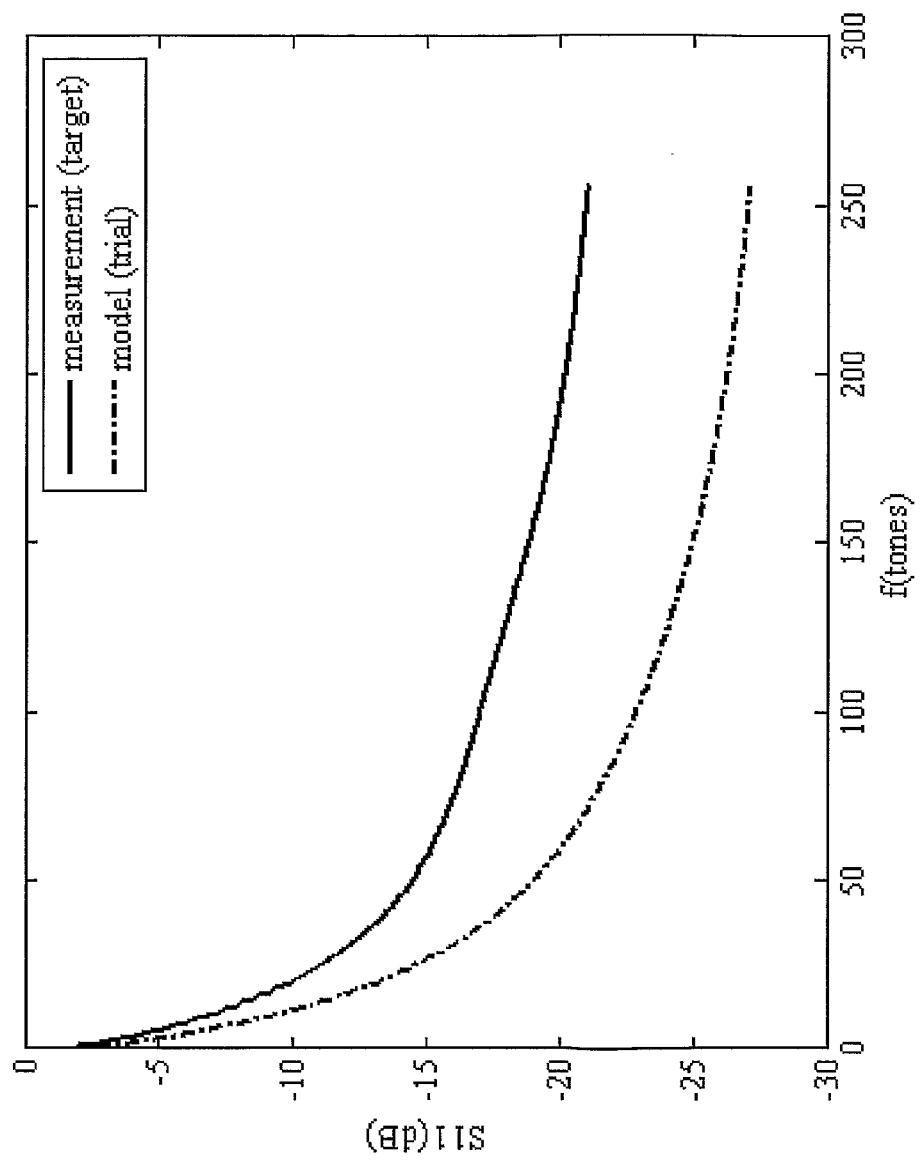
FIG. 2 shows an example of a comparison of the measured and model curves of the scattering parameters (FIG. 2a) and the transfer function (FIG. 2b), respectively.
Figure 2B:
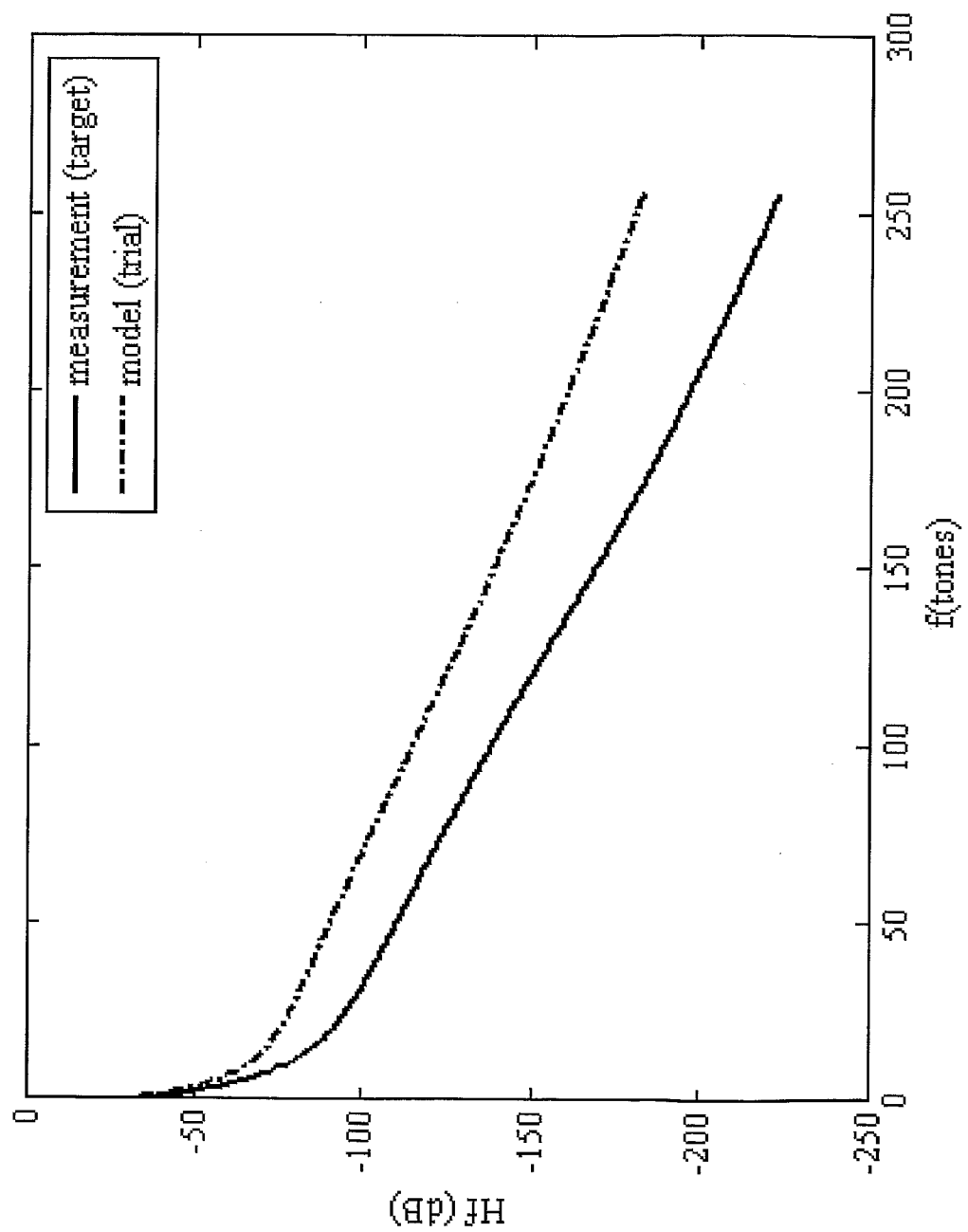

Thus, the present invention is a method of identification of loop makeup by the optimization of the physical parameters that will provide the minimal residual between the measured quantities and the found loop modelw2q. I.e. the aim is to find loop parameters for the model curve such that the model curves approach the measurement curves. In FIGS. 2a and 2b, it is shown an example of a comparison of the measured and model curves of the scattering parameters (FIG. 2a) and the transfer function (FIG. 2b), respectively.

The equations (1) and (2) are solved by a unit that may be located at the CO side, either in the CO modem or, preferably, on a centralized "Loop Qualification (LQ) management system". Further, the unit may also be located at the CPE-side, e.g. on a centralized "Loop Qualification (LQ) management system".

Figure 10:
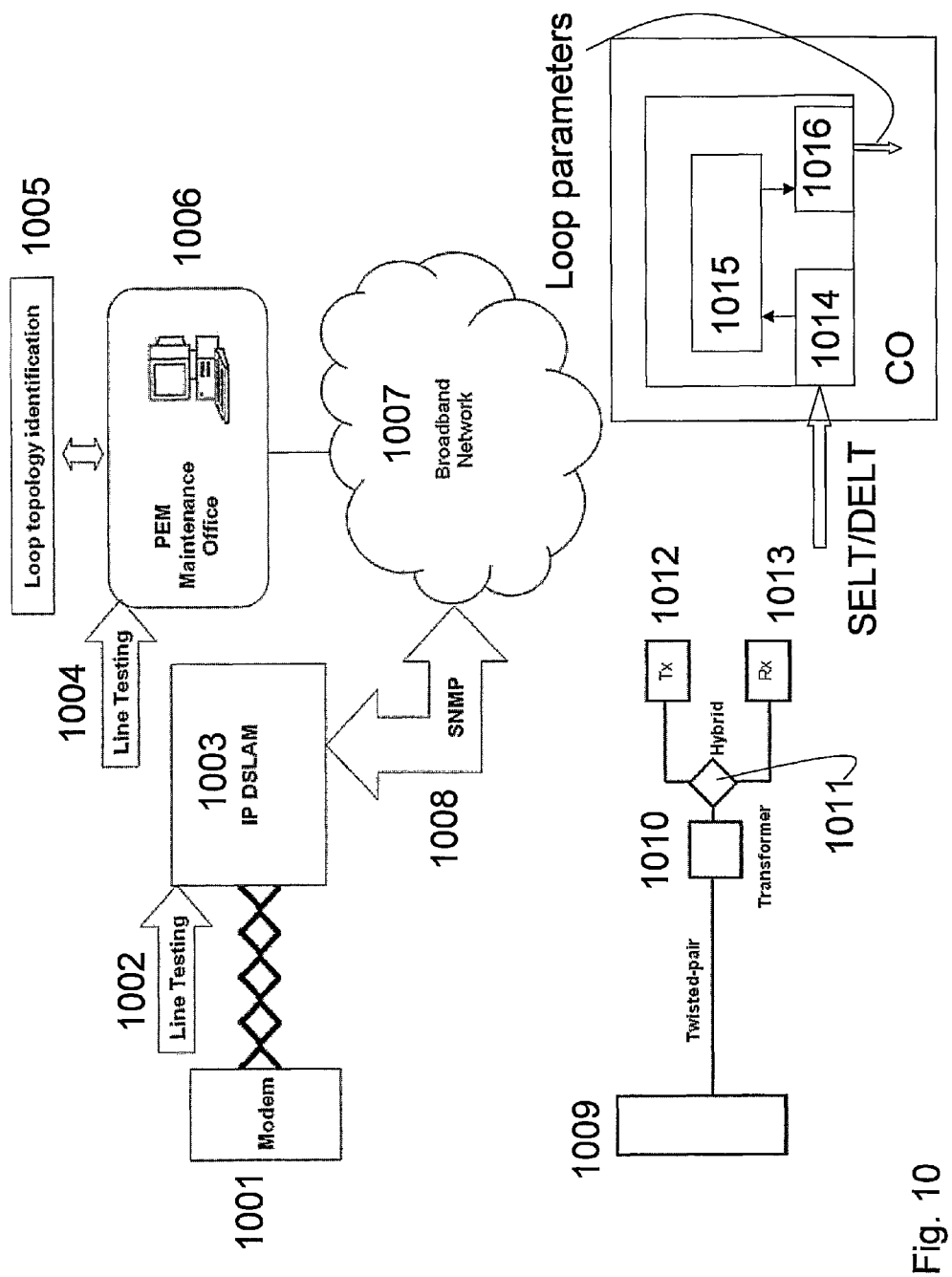
FIG. 10 illustrates a DSL system wherein the present invention may be implemented and the loop qualification unit according to the present invention.

FIG. 10 illustrates a DSL system wherein the present invention may be implemented. On the CPE side, is a user modem 1001 connected to the user's computer (not shown) to the telephone line (twisted pair). the modem 1001 is also connected as illustrated in FIG. 10 to the IP DSLAM (Internet Protocol Digital Subscriber Line Access Multiplexer) 1003 which is the equipment that provides xDSL service. The measured data 1002 obtained by modem are sent by the twisted-pair to the IP DSLAM 1003. Management information 1008 is exchanged between the Ip DSLAM and the broadband network 1007 by using SNMP (Simple Network Management Protocol).

The Line Testing 1004 is sent for PEM (Public Ethernet Manager) Maintenance Office via broadband network. PEM Maintenance Office is the control center that hosts the Loop Topology Identification. Loop Topology Identification 1005 is applied to determine the loop topology (twisted pair) from Line Testing data.

FIG. 10 also shows a modem 1009 in the hybrid circuit, the modem 1009 is connected 1010 to the hybrid circuit 1011 to the twisted pair loop. The hybrid circuit comprises a receiving part of the transceiver circuit 1013 and a transmitting part 1012 of the transceiver circuit.

Accordingly, the unit 1100 is illustrated in FIG. 10 when implemented in the CO 1003. The unit comprises a receiving member 1014 for receiving a measurement of a SELT parameter measured at one end of said two ends, e.g. at the CO and for receiving a measurement of a DELT loop transfer function measured at said two loop ends, e.g. at the CO and at the CPE. Further, the unit according to the present invention comprises a model generator 1015 for generating a model for the SELT parameter based on the loop parameters represented by the vector $\theta$ and for generating a model for the DELT loop transfer function based on the loop parameters represented by the vector $\theta$. The unit further comprises a processor 1016 adapted to determine the loop parameters represented by the vector $\theta$ by minimizing the difference between the model and the measurement of the SELT parameter and by minimizing the difference between the model and the measurement of the DELT loop transfer function, whereby the determined loop parameters are represented by the vector $\theta$ that provides said minimizations.

Since the two objective functions contain multiple unknown parameters e.g. length, gauge, type, number of sections, number of bridge-taps, a multi-dimensional optimization has to be solved. Several optimization routines may be applied to this problem. However, according to a preferred embodiment Genetic Algorithms (GA) are used, since it has been found by simulation of several test cases that the GA technique is well suitable for this application.

A genetic algorithm is a search technique used in computing to find true or approximate solutions to optimization and search problems. Genetic algorithms are implemented as a computer simulation in which a population of abstract representations called chromosomes or the genotype of candidate solutions called individuals creatures, or phenotypes to an optimization problem evolves toward better solutions. Traditionally, solutions are represented in binary as strings of 0s and 1s, but other encodings are also possible. The evolution usually starts from a population of randomly generated individuals belonging to a generation. In each generation, the fitness of every individual in the population is evaluated, multiple individuals are stochastically selected from the current population based on their fitness, and modified mutated or recombined to form a new population. The new population is then used in the next iteration of the algorithm.

A typical genetic algorithm requires two things to be defined:
1. a genetic representation of the solution domain,
2. a fitness function to evaluate the solution domain.

The representation of the solution domain is in the present invention the vector array of loop parameters, i.e. $\theta$.

A typical genetic algorithm requires two things to be defined:
1. a genetic representation of the solution domain,
2. a fitness function to evaluate the solution domain.

The representation of the solution domain is in the present invention the vector array of loop parameters, i.e. $\theta$.

The fitness function is defined over the genetic representation and measures the quality of the represented solution. The fitness function is always problem dependent. In the present invention, two fitness functions are used. One fitness function is associated with the scattering parameter, e.g. $V_1$ and another fitness function is associated with the transfer function, e.g. $V_2$. These fitness functions calculate the deviation between calculated curves obtained of GA solutions and measurement data of those parameters (target curves, i.e. the measurement). The lower this deviation is, the larger, is the fitness of the GA chromosome or GA solution.

Once a genetic representation and a fitness function is defined, GA proceeds to initialize a population of solutions randomly, and then improves it through repetitive application of mutation, crossover, and selection operators.

A primary exploration operator used in many genetic algorithms is crossover. Crossover proceeds in three steps: (1) two individuals are chosen from the population by using the selection operator, and these two structures are considered to be mated; (2) a cross site along the string length is chosen uniformly at random; and (3) position values are exchanged between the two strings following the cross site. But two individuals mate just if a random value associated of these individuals is lower than crossover probability. This random value is obtained at each generation for each individual's pair.

Mutation is the occasional (low probability, i.e. the mutation probability has a low value) alteration of a gene that composes the GA individual. When used together with selection and crossover, mutation acts both as an insurance policy against losing needed diversity. During application of this operator, random value is obtained for each gene and compared with mutation probability, if this random value is lower than mutation probability, the gene value is modified. Otherwise, that gene is not modified.

As stated above, initially many individual solutions are randomly generated to form an initial population. The population size depends on the nature of the problem, but typically contains several hundreds or thousands of possible solutions. Traditionally, the population is generated randomly, covering the entire range of possible solutions (the search space). Occasionally, the solutions may be "seeded" in areas where optimal solutions are likely to be found.

During each successive epoch a proportion of the existing population is selected to breed a new generation. Individual solutions are selected through a fitness-based process, where fitter solutions (as measured by a fitness function) are typically more likely to be selected. Certain selection methods rate the fitness of each solution and preferentially select the best solutions. Other methods rate only a random sample of the population, as this process may be very time-consuming.

Most functions are stochastic and designed so that a small proportion of less fit solutions are selected. This helps keep the diversity of the population large, preventing premature convergence on poor solutions. Popular and well-studied selection methods include roulette wheel selection and tournament selection.

The next step is to generate a second generation population of solutions from those selected through genetic operators: crossover (also called recombination), and/or mutation.

For each new solution to be produced, a pair of "parent" solutions is selected for breeding from the pool selected previously. By producing a "child" solution using the above methods of crossover and mutation, a new solution is created which typically shares many of the characteristics of its "parents". New parents are selected for each child, and the process continues until a new population of solutions of appropriate size is generated.

These processes ultimately result in the next, generation population of chromosomes that is different from the initial generation. Generally the average fitness will have increased by this procedure for the population, since only the best organisms from the first generation are selected for breeding, along with a small proportion of less fit for reasons already mentioned above.

This generational process is repeated until a termination condition has been reached. In the present invention the process is terminated when a solution is found that satisfies minimum criteria.

The control of the GA parameters in relation to the present invention will now be described.

Mutation process consists of the generation of a random value for each gene and the comparison of them with mutation probability. if the random value is lower than mutation probability, the gene value is modified. Otherwise, the gene is kept untouched.

The main GA operands that lead the optimization process are mutation probability and crossover probability. It is important to find optimum values for these operands in order to obtain reasonable results after the optimization process. However, basically this will depend on the problem under study. An attempt to become GA self-adaptive regarding to this issue is developed for this invention. It consists in discovering an optimal configuration for such operands at each iteration of the optimization process. To accomplish it, a sweeping on the values associated to GA operands is done, starting from high values (around 90-85%). This sweeping is conditioned to the evolution of the individuals' fitness: values that induce successive improvements on the fitness of the population are maintained until they do not provide improvement anymore. (In the GA terminology, the inverse of the residual associated to a certain cost-function is called fitness.) At this time, the current values of GA operands are decreased. Additionally, whenever some evolution on the elite individual's fitness occurs, the total number of generations is increased, providing more time to the algorithm to find the global minimum. Since the alteration of the GA operands' values is related to the evolution of the individuals' fitness, the final values for these operands can vary from one simulation to another. This process is improving the GA convergence, reducing the probability of getting stuck in a local minima. Basically, this process is used to control the GA parameters, i.e. the mutation and crossover probabilities. The process is shown in more details below. probcross and probmut are the current values of crossover and mutation probabilities, fitness is the vector with the fitness values of the population (called pop in this case) and calcfitness function is used to calculate this vector. countgen variable counts the number of generations with no evolution of the best individual's fitness. If fitelit (the fitness of best individual) is lesser than maximum fitness of population in a generation, the countgen variable is incremented by 1. Otherwise, i.e. if the best individual has evolved, the total number of generation to be carried out (ngeneration) is increased by gener (varying from 20 to 25), the countgen is reset with 0 and fitelit is updated with the maximum fitness in the current generation. But, if there is not evolution of GA population during a certain number of generations, given by the expression perc*(ngeneration−i) (where perc is a perceptual value varying from 5% to 10%), the probcross and probmut have their values decreased by the expression:

prob=prob−prob×δ where prob is the current value of mutation or crossover probabilities and δ is the perceptual value used to decrease such probabilities. The latter parameter is configured in the beginning of the optimization process. After that, it is applied the GA operators mutation and crossover, using this new values of those probabilities.

```
probcross= [probcrossmax,δpm]
probmut = [probmutmax,δpm]
                ⇓
for i=1:ngeneration
    fitness = calcfitness(pop);
    If fitelit <= max(fitness)
        countgen = countgen + 1;
    else
        ngeneration = ngeneration + Δgener;
        countgen = 0;
        fitelit = max(fitness);
    end
    if countgen > perc*(ngeneration - i)
        probmut = probmut−probmut×δpm
        probcross = probcross−probcross×δpc
        countgen = 0;
    end
    Mutation(pop,probmut);
    Crossover(pop,probcross);
end
```

Figure 3:
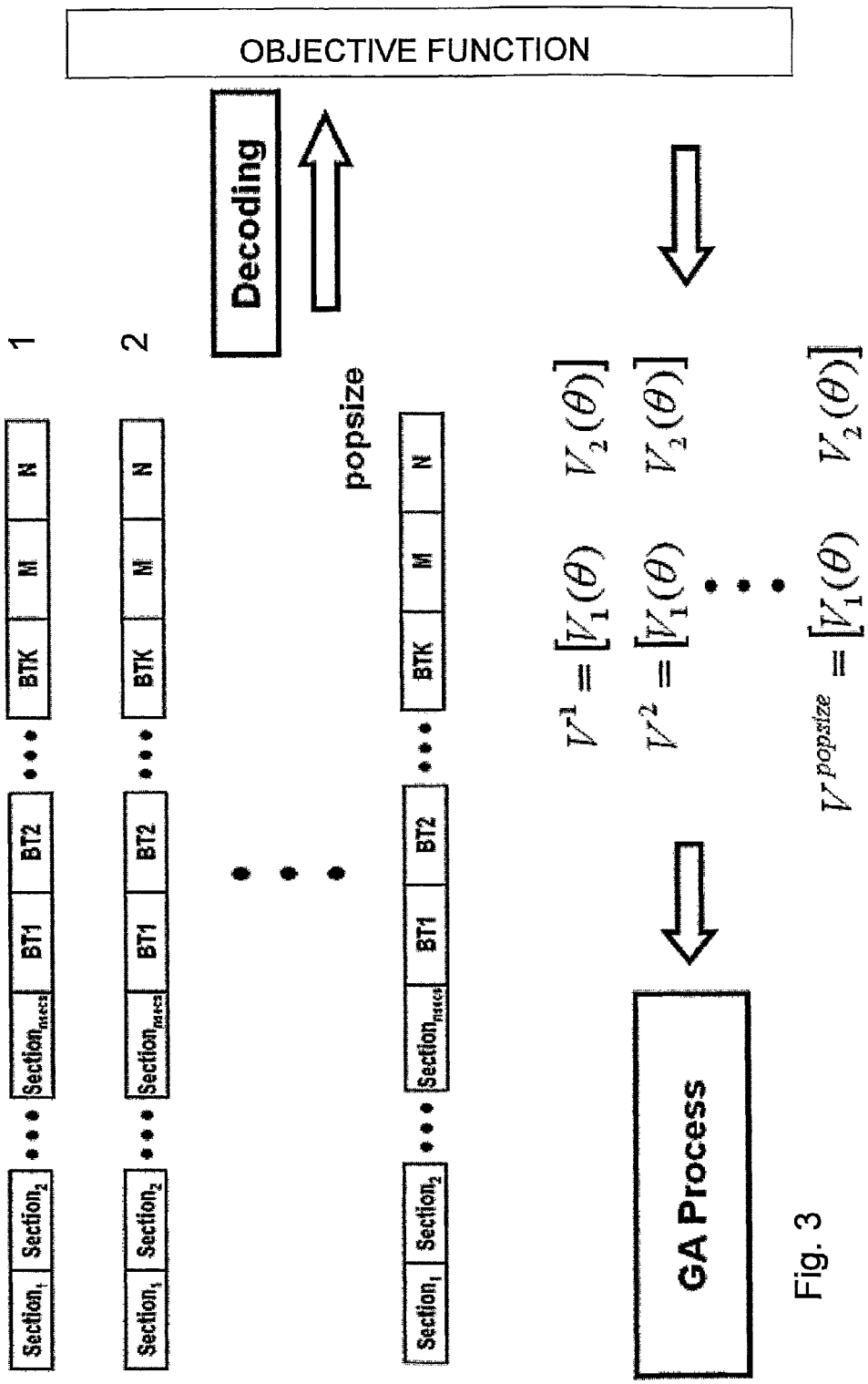
FIG. 3 shows the decoding and calculation procedures of the cost function using $S_{11}$ and H(f).

In FIG. 3, it is shown a diagram with decoding and evaluating process of the GA individuals. Each individual from GA represents a complete loop with information about number of sections, gauge and length of each section, number of bridge taps and its position. Therefore, an individual is a representation in the GA scope of the makeup structure (or θ). The popsize (size of GA population) number of individuals are decoded into their corresponding loop makeup and they are evaluated for the objective functions. The value of each cost function is used directly to qualify the individuals generated within Genetic Algorithms (GA). Therefore, to each individual is associated a vector $V(\theta)=[V_1(\theta)V_2(\theta)]$ containing the error mean square for each target curve. In the embodiment of the present invention, two target curves are used: the measured scattering and transfer function parameters. For each GA solution, these parameters can be calculated using a cable model, as for instance the VUB0 and BT. In principle, both line models can be applied to the GA concept. GA uses these objective function values to apply their operators in order to generate offspring of larger fitness, i.e., smaller values of the error mean square. For the application of the embodiment of the invention the NSGA-II for multi-objective optimization is used.

Figure 4:
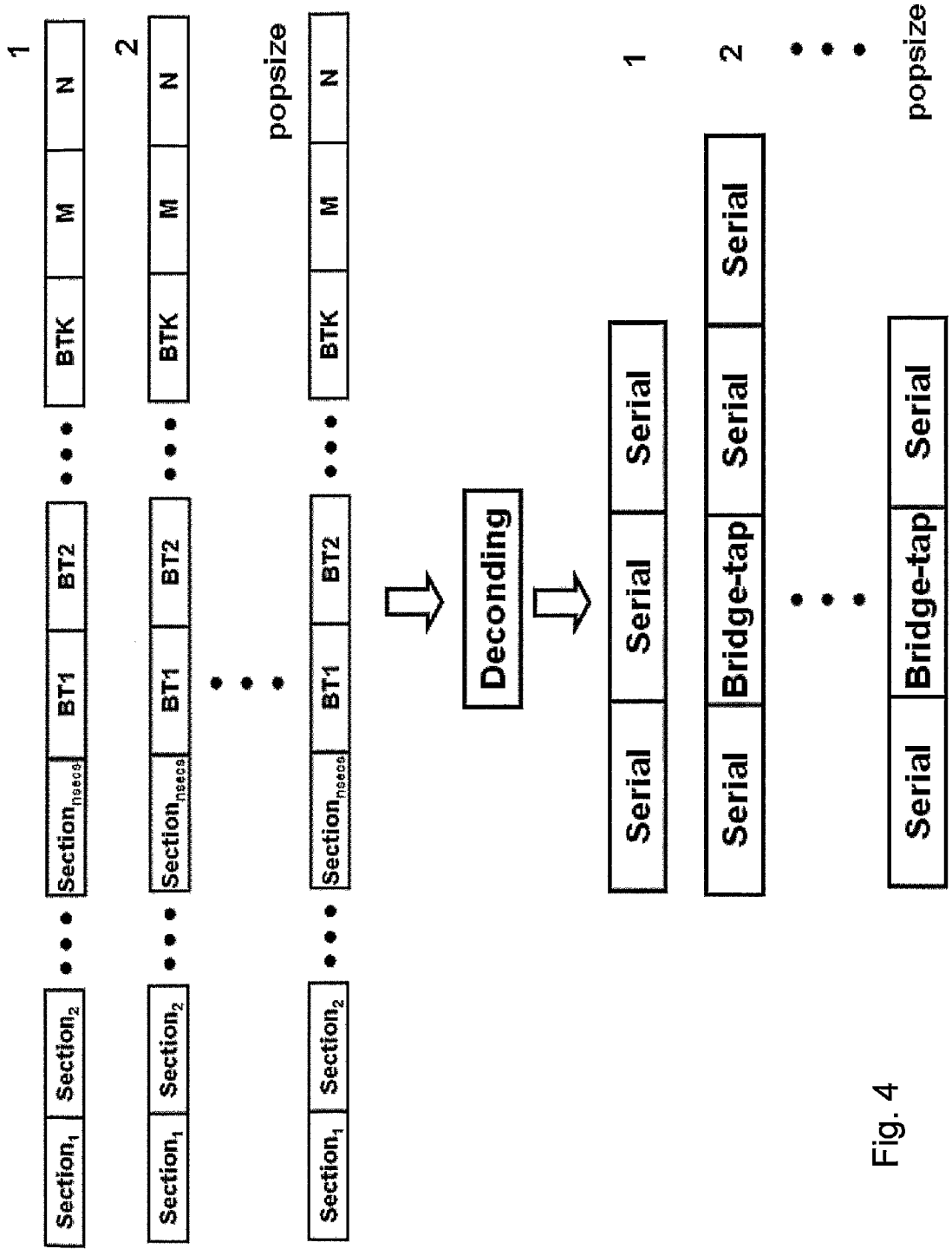
FIG. 4 shows the decoding process.

The important process in GA optimization is the decoding process. Basically, decoding process connects the GA process to the physical problem under optimization. The decoding process convert GA chromosome to the physical parameter. In case of the loop makeup application, the chromosome is converted to the makeup structure shown in FIG. 1. In FIG. 4, it is shown the decoding process, where each real number array is converted to loops, accordingly to their data, as shown on left side of FIG. 4. The coding/decoding strategies applied to GA are described below.

Figure 5:
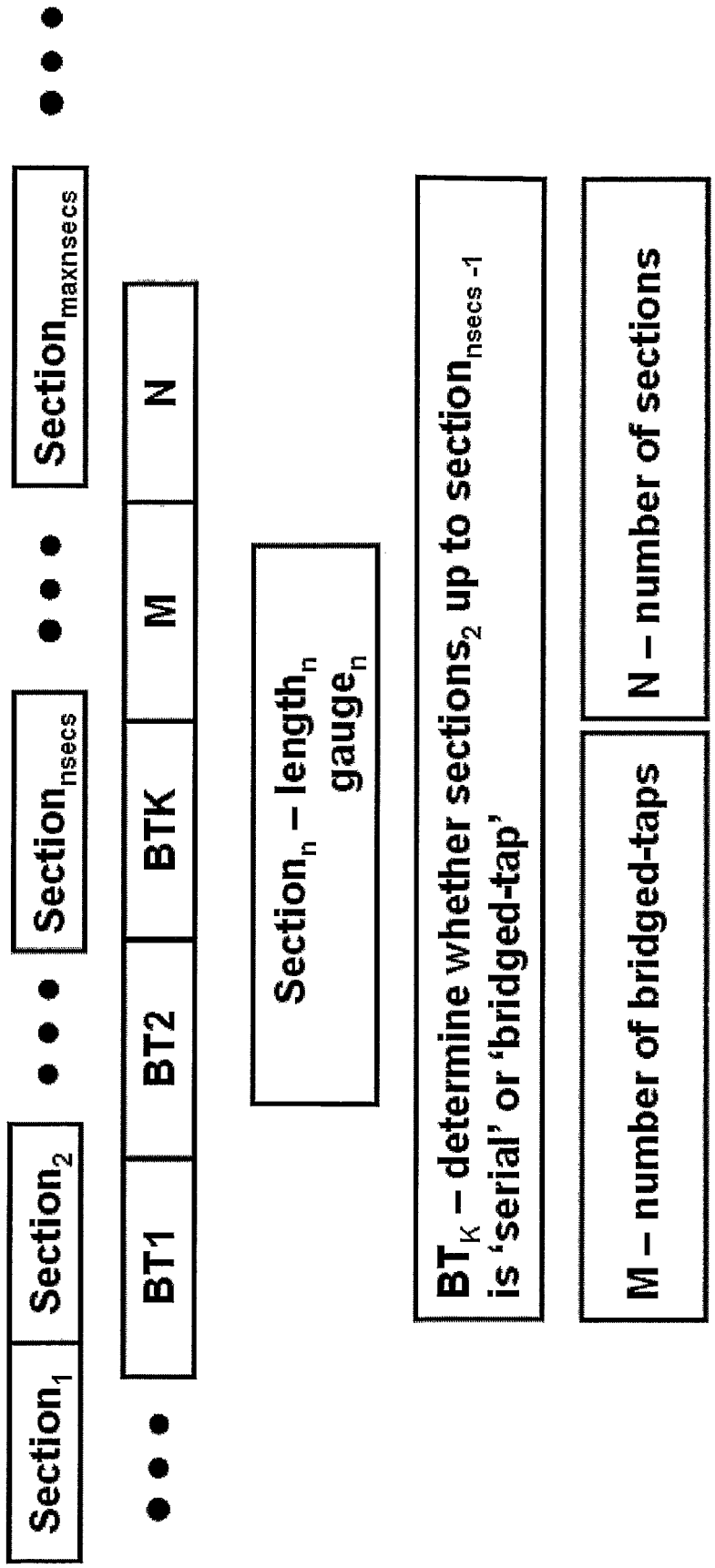
FIG. 5 shows a GA individual for application in loop makeup in ADSL systems.

The chromosome is composed as shown in FIG. 5. For each section, normalized value of the length and gauge are within the sub-arrays $section_1$-$section_{maxnsecs}$. The value N determines the number of sections varying from its minimum up to its maximum value (which can be configured by the user). M is the number of bridge-taps, which depends on the number of sections, and $BT_2$ up to $BT_{nsecs}$ indicates the position of these M bridge-taps.

Figure 6:
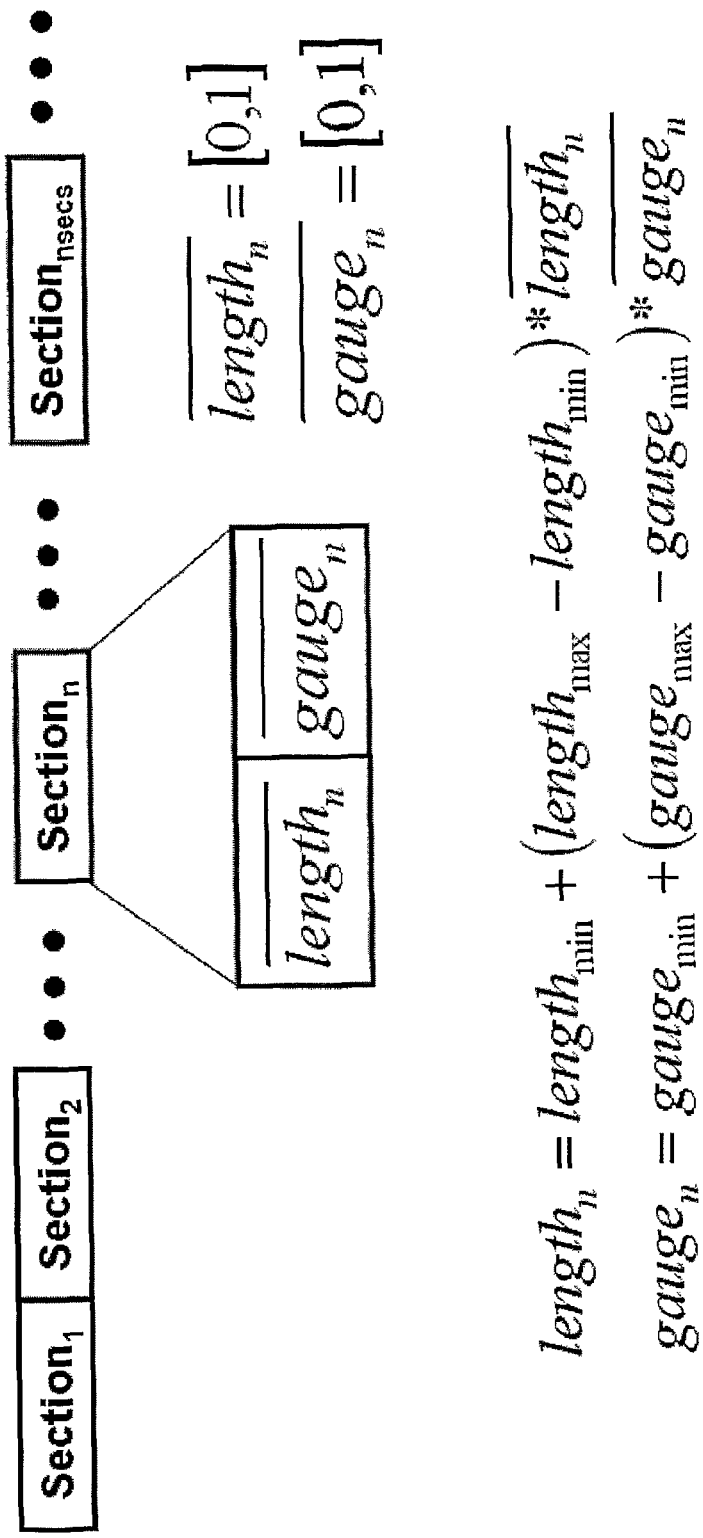
FIG. 6 shows a decoding process of the gauges and length.
Figure 7:
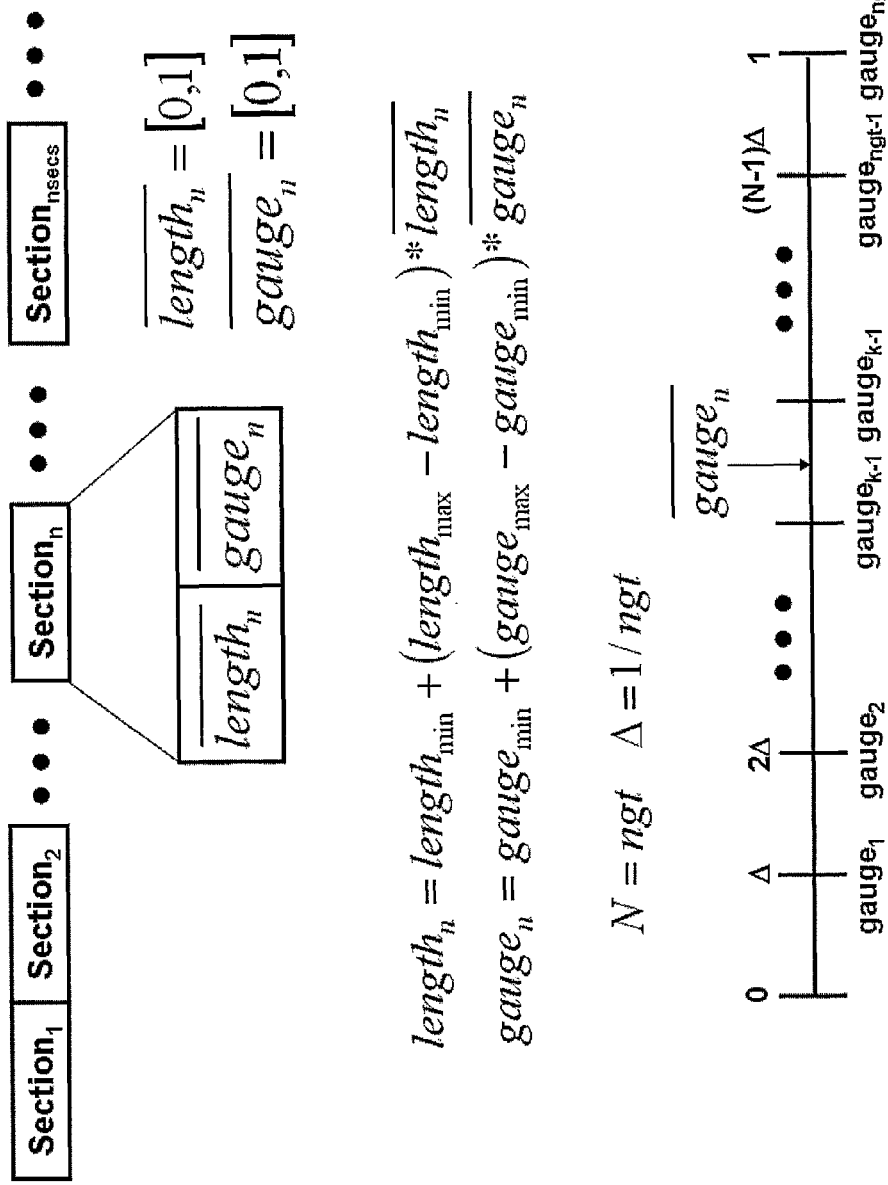
FIG. 7 shows a further decoding method for gauge.

The decoding process transforms the GA data into parameters of the physical problem under optimization, as explained previously. In FIG. 6, it is shown the decoding of the length and gauge—which is a simple process. Thus, for instance, the length values can assume any real value between $length_{min}$ and $length_{max}$. These values can be defined by user. This assures that the values are within a feasible range. However, another restrictive method can be used for decoding of the gauges because the gauges values can not vary continuously and can assume standard values. FIG. 7 describes this method. Basically, the interval between zero and one is divided into ngt sub-intervals (called in generic way of N), where ngt is the number of gauge values that will be used during the optimization process. Thus, the coding value of the gauge of each section is directly compared with each sub-interval. This procedure is repeated until the sub-interval that represents the gauge is found, as shown in FIG. 7, and thus, its gauge value is determined. Both decoding methods for gauge can be used.

Figure 8:
FIG. 8 shows the decoding of the number of sections.
Figure 8:

A possible method for the decoding process of the number of sections is shown in FIG. 8. The codified value of the number of sections could be, for instance, in the penultimate position of the individual vector—or penultimate gene of the chromosome in GA terminology (FIG. A4). The values 0.5 and 1.0, shown in FIG. 8, are related to all values of section from minsecs and maxnsecs having the same probability to occur. The values are integer values; they are rounded by Matlab™ via its round function. In this way, nsecs sections are considered to compose makeup structure. For instance, in FIG. 8, nsecs is equal to 3 and thus, all others sections starting from the fourth section are not taken into account in the calculation of the $S_{11}$ and of the H(f). Basically, the decoding method of the number of bridge-tap is also in the same way. In FIG. 9, nsecbt is the number of sections that can be a bridge-tap; as just the first section can not be bridged-tap, this parameter is equal to nsecs−1. Such bridge-taps should be alternate, thus the maximum number of bridge-taps (maxnbt) should be half of nsecbt.

Information about the number of bridge-taps is codified in the last gene ($\overline{N}$) and to decode it the same equation for decoding the number of sections (nsecs) is used. The position of the first bridge-tap (posfirstbt) is the maximum value of the genes $BT_2$ to $BT_{nsecs}$, and the position of the other bridge-taps are determined as a function of the position of the first bridge-tap, of course, considering the alternation between bridge-taps.

Other method for gauge decoding is the gaugesort. In previous paragraph, in decoding process of the gauges, the values of gauges could occur in any order and with repetition of its values. For some cases, especially for large number of sections, it appeared to be difficult the convergence of the optimization algorithm. In the majority of cases (at least), the gauge values found in the recommendation increase from the central office to the costumer premises and they do not repeat. In that way, a modification was implemented on the method described in FIG. 7. In this method, the number of sub-intervals for each section is dependent on an integer value set by user that determines the number of available gauges, the number of sections, the position in the gauge vector and the number of previously decoding sections. The code for this technique is shown below:

```
for i=1:nsecs
        N = ( ngst − jlast ) − nsecs + i;
        delta = 1 / N;
        for j=1:N
                if( ind(2*i) <= j*delta )
                        makeup(i).gauge = stgauge(j + jlast);
                        jlast = jlast + j;
                        break;
                end
        end
end
```

The parameter $j_{last}$ determines the last position of the gauge vector (stgauge) used. Basically, the number of sub-interval of each section (that it will define the number of gauges) is equal to the number of values of available gauge less the number of section that still are to be decoded, and not considering the values of gauges already used. In that way, the application of this technique avoids the repetition of gauges and assures that they are always growing. However, for this method to work, it is necessary that the number of gauges is at least equal to the number of sections. This method can also be disabled and enabled by user. This method accelerates the GA convergence for ETSI scenarios.

Below is shown the result obtained by the GA methodology according to the embodiment of the invention when $S_{11}$ is used as the SELT measurement.

ETSI test loops are defined in ITU-T G.996.1 "Test procedures for digital subscriber line (DSL) transceivers". From the values of the transfer function and scattering parameter of the ETSI #7 scenario, a simulation was carried out to obtain its parameters. Table 1 shows the true values of the parameters for scenario ETSI loop #7.

TABLE 1

| Scenario ETSI #7 ETSI #7 (I_loss = 36) | | | |
|---|---|---|---|
| Type | Serial | Serial | Serial |
| Length (km) | 0.20 | 0.60 | 4.00 |
| Gauge (mm) | 0.32 | 0.40 | 0.90 |

Figure 11:
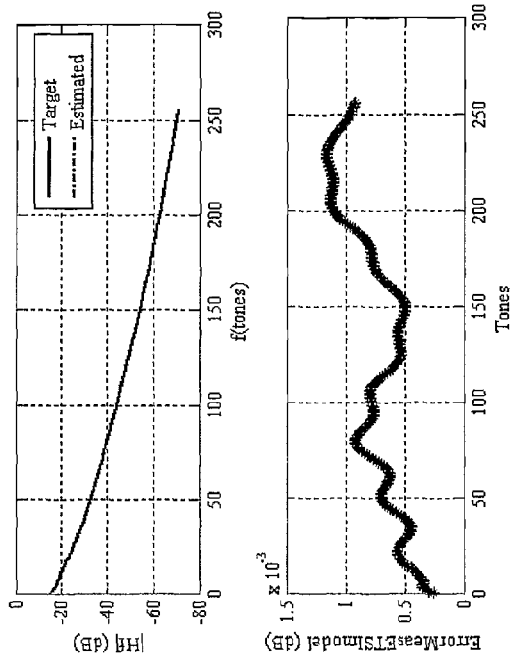
FIG. 11 shows a comparison of the magnitude of the scattering parameter for ETSI #7 and estimated loop with smallest value of the cost function of $H_f$.
Figure 12:
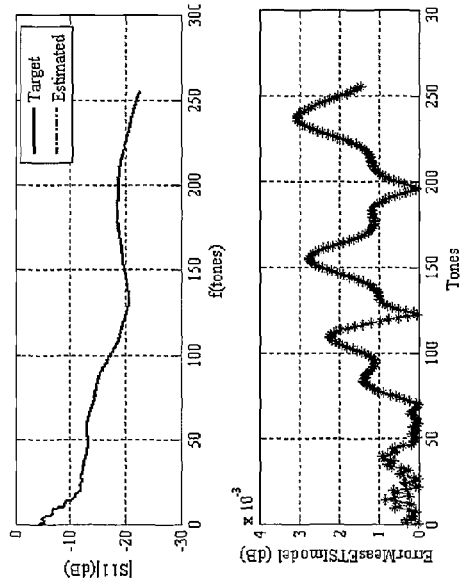
FIG. 12 illustrates a comparison of the magnitude of transfer function for ETSI #7 and estimated loop with smallest value of the cost function of $H_f$.
Figure 13:
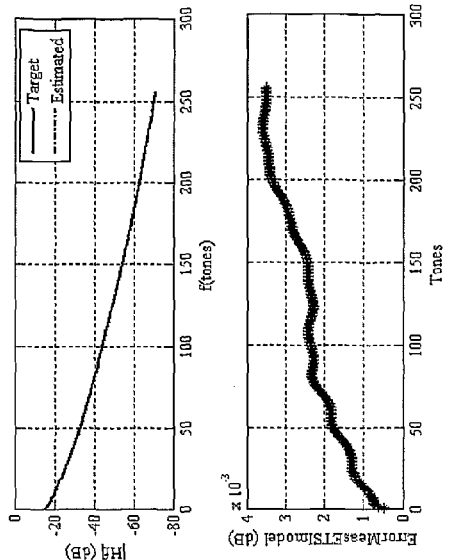
FIG. 13 illustrates a comparison of the magnitude of the scattering parameter for ETSI #7 and estimated loop with smallest value of the cost function of $S_{11}$
Figure 14:
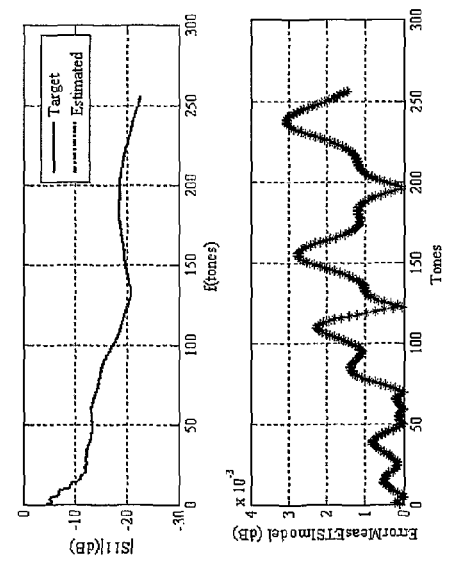
FIG. 14 illustrates a comparison of the magnitude of transfer function for ETSI #7 and estimated loop with smallest value of the cost function of $S_{11}$.

The GA results are shown in Table 2. Table 3 contains estimations of the smallest value of the scattering parameter and estimative of the smallest value of the transfer function, respectively. The error of the estimative remains below 2e-5 dB for $S_{11}$ and 3.15e-5 dB for H(f) as can be seen in FIGS. 11 to 14. FIG. 11 shows a comparison of the magnitude of the scattering parameter for ETSI #7 and estimated loop with smallest value of the cost function of $H_f$. FIG. 12 illustrates a comparison of the magnitude of transfer function for ETSI #7 and estimated loop with smallest value of the cost function of $H_f$. FIG. 13 illustrates a comparison of the magnitude of the scattering parameter for ETSI #7 and estimated loop with smallest value of the cost function of $S_{11}$. FIG. 14 illustrates a comparison of the magnitude of transfer function for ETSI #7 and estimated loop with smallest value of the cost function of $S_{11}$

TABLE 2

Values of the estimated parameters
ETSI #7 (I__loss = 36)

| Type | Serial | Serial | Serial |
|---|---|---|---|
| Length (km) | 0.19997 | 0.60012 | 3.99991 |
| Gauge (mm) | 0.32 | 0.40 | 0.90 |

TABLE 3

Values of the estimated parameters
ETSI #7 (I__loss = 36)

| Type | Serial | Serial | Serial |
|---|---|---|---|
| Length (km) | 0.19997 | 0.60012 | 4.00012 |
| Gauge (mm) | 0.32 | 0.40 | 0.90 |

Figure 15:
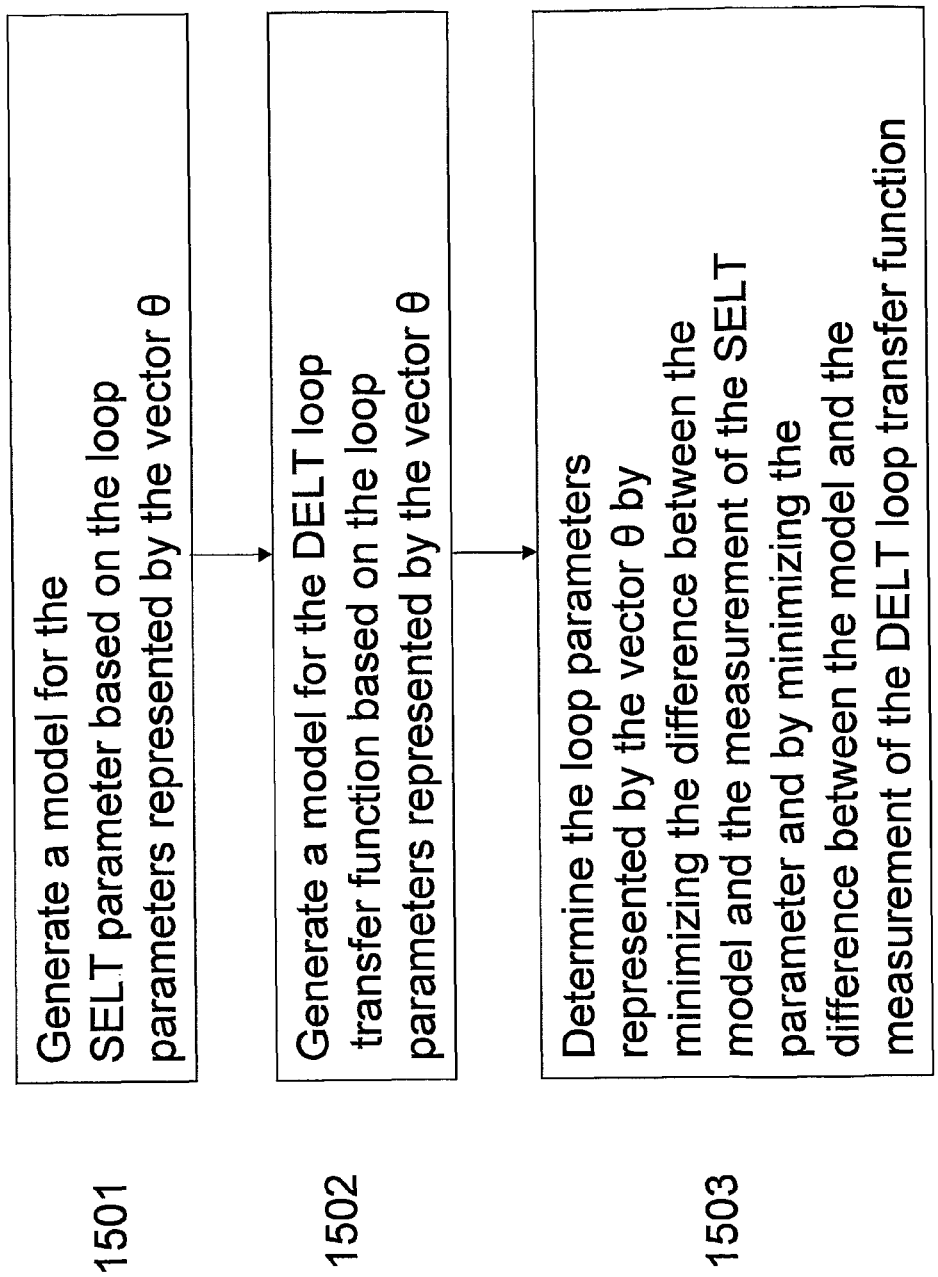
FIG. 15 is a flowchart of the method according to the present invention.

Thus, the present invention relates to a method illustrated by the flowchart of FIG. 15. The method comprises the steps of:

1501. Generate a model for the SELT parameter based on the loop parameters represented by the vector θ.

1502. Generate a model for the DELT loop transfer function based on the loop parameters represented by the vector θ.

1503. Determine the loop parameters represented by the vector θ by minimizing the difference between the model and the measurement of the SELT parameter and by minimizing the difference between the model and the measurement of the DELT loop transfer function, whereby the determined loop parameters are represented by the vector θ that provides said minimizations.

Figure 16:
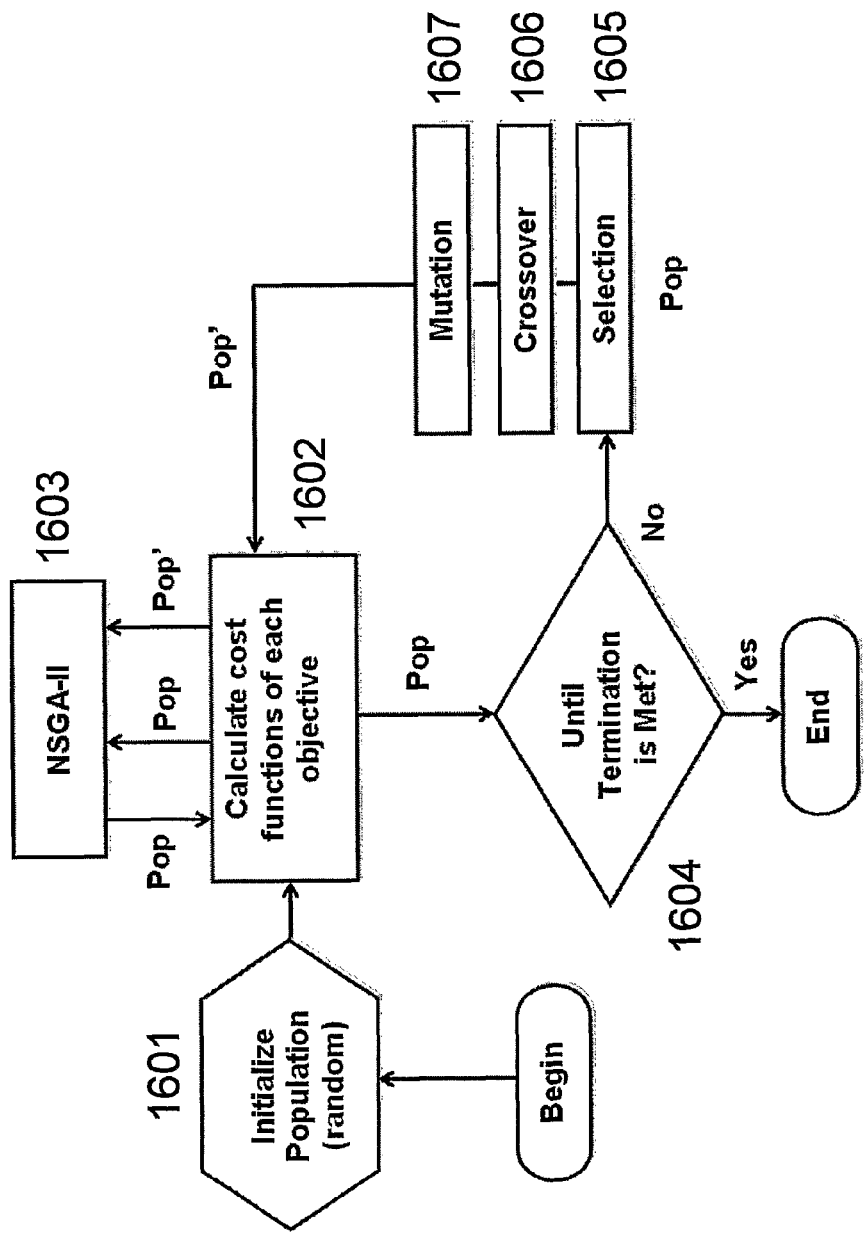
FIG. 16 is a flowchart of one embodiment where GA is used to determine the loop parameters.

According to an embodiment, GA may be used for determining the loop parameters. The flowchart of FIG. 16 illustrates that embodiment.

1601. Initialize a population.
1602. Calculate cost functions, e.g. $V_1$ and $V_2$.
1603. The cost functions are solved by using NSGA-II.
1604. GA process stop criterion
1605. Select individuals from GA population to compose a new population
1606. Apply the crossover operator to the selected individuals
1607. Apply the mutation operator to the selected individuals While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for determining loop parameters describing a topology of a twisted pair loop, having two ends, for a digital subscriber line system, wherein the loop parameters being represented by a vector θ comprising the steps of:

receiving a measurement of a Single Ended Line Test (SELT) parameter measured at one end of the two ends;

receiving a measurement of a Double Ended Line Test (DELT) loop transfer function measured at the two loop ends;

generating a first model for the SELT parameter based on the loop parameters represented by the vector θ;

generating a second model for the DELT loop transfer function based on the loop parameters represented by the vector θ; and determining the loop parameters represented by the vector θ by minimizing the difference between the first model and the measurement of the SELT parameter and by minimizing the difference between the second model and the measurement of the DELT loop transfer function, wherein the determined loop parameters are represented by the vector θ that provides the minimizations.

2. The method according to claim 1, wherein the SELT parameter is a one port scattering parameter S.

3. The method according to claim 1, wherein the SELT parameter is an input impedance $Z_{in}$.

4. The method according to claim 1, wherein the determining step further comprises the step of:

applying an optimization method of genetic algorithm searching for a parameter configuration of vector θ that minimizes the differences.

5. A method for determining loop parameters describing a topology of a twisted pair loop, having two ends, for a digital subscriber line system, wherein the loop parameters being represented by a vector θ comprising the steps of:

a) receiving a measurement of a Single Ended Line Test (SELT) parameter measured at one end of the two ends;

b) receiving a measurement of a Double Ended Line Test (DELT) loop transfer function measured at the two loop ends;

c) generating a first model for the SELT parameter based on the loop parameters represented by the vector θ;

d) generating a second model for the DELT loop transfer function based on the loop parameters represented by the vector θ;

e) determining the loop parameters represented by the vector θ by minimizing the difference between the first model and the measurement of the SELT parameter and by minimizing the difference between the second model and the measurement of the DELT loop transfer function, wherein the determined loop parameters are represented by the vector θ that provides the minimizations; and f) performing steps a) through e) at least a second time in which the measurements are performed in a different frequency range.

6. The method according to claim 1, wherein the loop parameters comprises at least one of gauge, length, and type.

7. The method according to claim 1, wherein the steps are performed in a Central Office modem.

8. The method according to claim 7, wherein the steps are performed in a Central Office modem on a centralized Loop Qualification (LQ) management system.

9. The method according to claim 1, wherein the steps are performed in a customer premise modem.

10. The method according to claim 9, wherein the steps are performed in a Central premise modem on a centralized Loop Qualification (LQ) management system.

11. A loop qualification unit for determining loop parameters describing a topology of a twisted pair loop, having two ends, for a digital subscriber line system, wherein the loop parameters are represented by a vector comprising a receiving member for receiving a measurement of a Single Ended Line Test (SELT) parameter measured at one end of the two ends and for receiving a measurement of a Double Ended Line Test (DELT) loop transfer function measured at the two loop ends, said loop qualification unit comprising:

a first model generator for generating a first model for the SELT parameter based on the loop parameters represented by the vector θ;

a second model generator for generating a second model for the DELT loop transfer function based on the loop parameters represented by the vector θ; and a processor for determining the loop parameters represented by the vector θ by minimizing the difference between the first model and the measurement of the SELT parameter and by minimizing the difference between the second model and the measurement of the DELT loop transfer function, wherein the determined loop parameters are represented by the vector θ that provides the minimizations.

12. The loop qualification unit according to claim 11, wherein the SELT parameter is a one port scattering parameter $S_{11}$.

13. The loop qualification unit according to claim 11, wherein the SELT parameter is an input impedance $Z_{in}$.

14. The loop qualification unit according to claim 11, wherein the processor further comprises means for applying an optimization method of genetic algorithm searching for a parameter configuration of vector θ that minimizes the differences.

15. A loop qualification unit for determining loop parameters describing a topology of a twisted pair loop, having two ends, for a digital subscriber line system, wherein the loop parameters are represented by a vector θ comprising a receiving member for receiving a measurement of a Single Ended Line Test (SELT) parameter measured at one end of the two ends and for receiving a measurement of a Double Ended Line Test (DELT) loop transfer function measured at the two loop ends, said loop qualification unit comprising:

a first model generator for generating a first model for the SELT parameter based on the loop parameters represented by the vector θ;

a second model generator for generating a second model for the DELT loop transfer function based on the loop parameters represented by the vector θ; and a processor for determining the loop parameters represented by the vector θ by minimizing the difference between the first model and the measurement of the SELT parameter and by minimizing the difference between the second model and the measurement of the DELT loop transfer function, wherein the determined loop parameters are represented by the vector θ that provides the minimizations;

wherein the receiving member, the model generators, and the processor are adapted to be operated at least a second time in which the measurements are performed in a different frequency range.

16. The loop qualification unit according to claim 11, wherein the loop parameters comprise at least one of gauge, length, and type.

17. The loop qualification unit according to claim 11, wherein the unit is located in a Central Office modem.

18. The loop qualification unit according to claim 17, wherein the unit is located in a Central Office modem on a centralized Loop Qualification (LQ) management system.

19. The loop qualification unit according to claim 11, wherein the unit is located in a customer premise modem.

20. The loop qualification unit according to claim 19, wherein the unit is located in a Central premise modem on a centralized Loop Qualification (LQ) management system.

* * * * *

UNITED STATES PATENT AND TRADEMARK OFFICE
CERTIFICATE OF CORRECTION

PATENT NO. : 8,254,527 B2
APPLICATION NO. : 12/446259
DATED : August 28, 2012
INVENTOR(S) : Lindqvist et al.

Page 1 of 1

It is certified that error appears in the above-identified patent and that said Letters Patent is hereby corrected as shown below:

On the Face Page, in Field (56), under "OTHER PUBLICATIONS", in Column 2, Line 5, delete "et a." and insert -- et al. --, therefor.

In Fig. 4, Sheet 5 of 14, delete "Deconding", and insert -- Decoding --, therefor.

In Fig. 12, Sheet 12 of 14, delete " Fig. 12 ", and insert -- Fig. 12 --, therefor.

In Column 6, Line 33, delete "$\sigma_{11,k}$" and insert -- $\sigma_{H,k}$ --, therefor.

In Column 7, Line 57, delete "individuals" and insert -- individuals, --, therefor.

In Column 8, Lines 7-13, delete "A typical genetic.....i.e. θ."

In Column 8, Line 23, delete "larger," and insert -- larger --, therefor.

In Column 8, Line 57, delete "epoch" and insert -- epoch, --, therefor.

In Column 9, Line 15, delete "next," and insert -- next --, therefor.

In Column 9, Line 20, delete "for" and insert -- solutions, for --, therefor.

In Column 9, Line 30, delete "probability. if" and insert -- probability, if --, therefor.

In Column 9, Line 60, delete "below. probcross" and insert -- below, probcross --, therefor.

In Column 14, Line 17, in Claim 2, delete "S." and insert -- $S_{11}$. --, therefor.

Signed and Sealed this
Twelfth Day of February, 2013

Teresa Stanek Rea
*Acting Director of the United States Patent and Trademark Office*